Patented Mar. 31, 1925.

1,531,845

UNITED STATES PATENT OFFICE.

PATRICK J. CONBOY, OF NEWARK, NEW JERSEY, ASSIGNOR OF ONE-HALF TO JOHN W. McGEEHAN, JR., OF NEWARK, NEW JERSEY.

COMPOSITION OF MATTER.

No Drawing. Application filed February 10, 1923. Serial No. 618,403.

*To all whom it may concern:*

Be it known that I, PATRICK J. CONBOY, a citizen of the United States, and a resident of Newark, county of Essex, and State of New Jersey, have invented certain new and useful Improvements in Composition of Matter, of which the following is a specification.

This invention relates to an improved composition of matter, the materials, when combined, forming a composition suitable for use in the manufacture of panels, plates and blocks adapted for use in electrical installations, being well adapted for this purpose because it is a non-conductor of electricity, and it is also adapted for use in the manufacture of handles, bottle tops, socket keys and other uses to which such materials are applied, being subjected to the action of dies when heated, and when cool forming a smooth hard substance with a surface that has a fair degree of gloss.

In such materials as heretofore combined it has been necessary to use shellac, which use is objectionable on account of the expense, as shellac is a relatively expensive material, but my invention has provided a composition which makes it unnecessary to use shellac, thus providing a binder and also a surface quality that prevents the material from sticking in dies when pressed.

In this composition I use a filler of any kind, mineral or clay, and examples of such fillers are asbestos, mica, terra alba, marble dust, and clays or minerals of other kinds which are adapted for the purpose. I also place therein, for the purpose of strengthening the material, a quantity of flock, and for the purpose of assisting in binding the parts together I use carnauba wax, for instance, and also rosin. Suitable coloring matter can be used; for instance, zinc or lithopone can be used for making the composition white, lamp black for making a black composition, and other colors now used can be employed for imparting any desired color to the finished product.

As a substitute for shellac, and providing a binder of proper surface quality, I include in the mixture peroxide of hydrogen combined with a wax or gum binder, such as carnauba wax, and I may also include copal.

This material is not tacky when properly mixed together, and thus is prevented from sticking, giving it a better surface quality for the use to which such materials are put, and furthermore provides a much cheaper composition than when shellac is used.

As an example of a suitable mixture, and indicating the approximate quantities, the following is submitted: 15 pounds asbestos, 15 pounds mica, 1½ pounds flock, ½ pound carnauba wax, 2 pounds rosin, 2 pounds zinc, 2 ounces peroxide of hydrogen, 5 pounds copal.

The mixture quoted above is for a white composition, since the zinc is indicated as the coloring matter. In place of mica or asbestos I may use any other earth or mineral filler, such as marble dust or talcum.

This batch of material can be put onto a pair of mixing rollers for the purpose of intermingling the materials, or they can be mixed in a kettle by hand on any suitable heating device, and after being mixed thoroughly the composition can be run off in sheets, through rollers, at a temperature of 200° F. or more, providing sufficient heat to melt it into a paste, and in this condition it is ready for use in dies, in which it is usually compressed and from which it can be easily removed, as the surface is not tacky.

The fact that the material after being molded comes directly and easily from the die I think is due to the presence of the peroxide of hydrogen which affects the wax or gum binder to give it the smooth non-tacky surface which is present in the finished product.

I claim:

1. A composition of matter for molding with hot dies, comprising a filler and a binder including a wax having a tendency to stick to the dies and peroxide of hydrogen.

2. A composition of matter comprising a mineral filler, coloring matter, and a binder including carnauba wax and peroxide of hydrogen.

3. A composition of matter comprising a mineral filler, flock, rosin and a binder including carnauba wax and peroxide of hydrogen.

4. A composition of matter comprising a mineral filler, flock, rosin, coloring matter, carnauba wax, copal and peroxide of hydrogen.

In testimony that I claim the foregoing, I have hereto set my hand, this 26th day of January, 1923.

P. J. CONBOY.